(12) United States Patent
Wang et al.

(10) Patent No.: US 9,358,736 B2
(45) Date of Patent: Jun. 7, 2016

(54) METHOD OF PACKAGING AND MANUFACTURING A CONTACT LENS IN A CONTAINER

(71) Applicant: Largan Medical Co., Ltd., Taichung (TW)

(72) Inventors: Chung-Lin Wang, Taichung (TW);
Chen-Yi Huang, Taichung (TW);
Tsung-Lin Wu, Taichung (TW)

(73) Assignee: LARGAN MEDICAL CO., LTD., Taichung (TW)

( * ) Notice: Subject to any disclaimer, the term of this patent is extended or adjusted under 35 U.S.C. 154(b) by 508 days.

(21) Appl. No.: 13/791,409

(22) Filed: Mar. 8, 2013

(65) Prior Publication Data

US 2013/0180212 A1    Jul. 18, 2013

Related U.S. Application Data

(63) Continuation-in-part of application No. 13/180,334, filed on Jul. 11, 2011, now abandoned.

(51) Int. Cl.
*B29D 11/00* (2006.01)
*B65B 25/00* (2006.01)
*A45C 11/00* (2006.01)

(52) U.S. Cl.
CPC .... *B29D 11/00125* (2013.01); *B29D 11/00567* (2013.01); *B65B 25/008* (2013.01); *A45C 11/005* (2013.01); *B29D 11/0048* (2013.01)

(58) Field of Classification Search
CPC ........... B65B 25/008; B29D 11/00567; B29D 11/0048; A45C 11/005
USPC ........... 53/413, 134.1, 331.5; 206/5.1; 249/96
See application file for complete search history.

(56) References Cited

U.S. PATENT DOCUMENTS

| | | | | |
|---|---|---|---|---|
| 5,036,971 A | * | 8/1991 | Seden .................. | A45C 11/005 206/5.1 |
| 6,012,471 A | * | 1/2000 | Calvin .................. | B29C 31/00 134/58 R |
| 2006/0219577 A1 | * | 10/2006 | Newman .............. | A45C 11/005 206/5.1 |

FOREIGN PATENT DOCUMENTS

CN        101791864 A  *  8/2010

OTHER PUBLICATIONS

Cai et al., CN 101791864 Machine Translation Chinese to Eng.*
Cai et al. NC 101791864 Machine Translation Chinese to Eng.*
Cai et al., CN 101791864 English Abstract.*

* cited by examiner

*Primary Examiner* — Alison L Hindenlang
*Assistant Examiner* — Lawrence D Hohenbrink, Jr.
(74) *Attorney, Agent, or Firm* — Locke Lord LLP; Tim Tingkang Xia, Esq.

(57) ABSTRACT

This invention provides a method of packaging and manufacturing a contact lens in a container, wherein the container comprises a central recess formed of a curved surface with a ring-shaped protruding portion surrounding the curved surface, the method comprising the steps of: providing the container; injecting a lens-forming monomer mixture into the central recess to form the contact lens along the curved surface of the central recess; combining the container and a hand-held section; pouring a solution into the container to immerse the contact lens in the container; and sealing the container with a lid for sealing the contact lens and the solution in the container; wherein the curved surface of the central recess has one or a plurality of continuous radii of curvature $R_{recess}$ less than a radius of curvature $R_{lens}$ of the contact lens in its hydrous state.

10 Claims, 6 Drawing Sheets

METHOD OF PACKAGING AND MANUFACTURING A CONTACT LENS IN A CONTAINER

CROSS-REFERENCE TO RELATED APPLICATIONS

This application is a continuation-in-part of U.S. Non-Provisional patent application having Ser. No. 13/180,334, entitled "CONTAINER FOR A CONTACT LENS", and filed on Jul. 11, 2011, which is incorporated herein by reference in its entirety. The U.S. Non-Provisional patent application (Ser. No. 13/180,334) claims priority on Patent Application No. 100113855 filed in Taiwan, R.O.C. on Apr. 21, 2011, the entire contents of which are hereby incorporated by reference.

BACKGROUND OF THE INVENTION

1. Field of the Invention

The present invention relates to a method of packaging and manufacturing a contact lens in a container, and more particularly, to a method of packaging and manufacturing a contact lens in a disposable container.

2. Description of the Prior Art

Nowadays people spend more time watching TV and multimedia materials due to the great audio and visual effects provided thereby and the popularity of mass media. Therefore, the number of short-sighted youngsters is growing. Short-sighted people need to wear glasses to correct their vision, and there are generally two types of glasses, (rimmed/rimless) glasses with temple arms and contact lenses.

Contact lens has been a popular option since being invented in the 1970s. As the improved manufacturing methods drive down the production cost and many consider their appearance to be more attractive with contact lenses than with glasses, the popularity of contact lenses has surged. With the change in life style, there is an increasing demand for disposable contact lenses. A growing number of people turn to disposable contact lenses because they are cheap and need no maintenance.

Generally, the package of a disposable contact lens (prescribed to be disposed of on a monthly, weekly or daily basis) comprises a plastic-injection-molded container and a flexible lid covering the container. The container has a recess for holding a contact lens and an antiseptic solution. The flexible lid is made of flexible material and configured to seal the recess so that the contact lens will not be contaminated. The user can tear off the flexible lid to pick up the contact lens and wear it.

SUMMARY OF THE INVENTION

The present invention is directed towards a method of packaging and manufacturing a contact lens in a container. The container comprises a round-shaped central recess formed of a curved surface, a peripheral groove, a rim and a tenon. The central recess is provided with a ring-shaped protruding portion to prevent the contact lens from being flung away from the container during the manufacturing process or having burrs or a rough edge.

The present invention provides a method of packaging and manufacturing a contact lens in a container, wherein the container comprises a round-shaped central recess formed of a curved surface being surrounded by a ring-shaped protruding portion, a peripheral groove surrounding the central recess, a rim surrounding the peripheral groove, and at least one tenon disposed on a supporting portion of the container, the method comprising the steps of: providing the container; injecting a lens-forming monomer mixture into the central recess to form a contact lens along the curved surface of the central recess while the ring-shaped protruding portion being provided to prevent the contact lens from being flung away from the container; connecting the tenon of the container and a hand-held section having at least one engaging portion at an inner wall thereof and an opening as well as an extended portion extending outward from the opening, via the engaging portion; pouring a solution into the container to immerse the contact lens in the container; and sealing the rim of the container with a lid for sealing the contact lens and the solution in the container; wherein the curved surface of the central recess has one or a plurality of continuous radii of curvature $R_{recess}$ less than a radius of curvature $R_{lens}$ of the contact lens in its hydrous state.

The present invention also provides a method of packaging and manufacturing a contact lens in a container, wherein the container comprises a central recess formed of a curved surface with a ring-shaped protruding portion surrounding the curved surface, the method comprising the steps of: providing the container; injecting a lens-forming monomer mixture into the central recess to form the contact lens along the curved surface of the central recess while the ring-shaped protruding portion being provided to prevent the contact lens from being flung away from the container for a contact lens; pouring a solution into the container to immerse the contact lens in the container; sealing the container with a lid for sealing the contact lens and the solution in the container; and combining the container and a hand-held section; wherein the curved surface of the central recess has one or a plurality of continuous radii of curvature $R_{recess}$ less than a radius of curvature $R_{lens}$ of the contact lens in its hydrous state.

BRIEF DESCRIPTION OF THE DRAWINGS

The invention is illustrated by way of example and not limitation in the accompanying figures.

DETAILED DESCRIPTION OF THE PREFERRED EMBODIMENTS

The present invention will be described more fully hereinafter with reference to the accompanying drawings, in which preferred embodiments of the present invention are shown.

Figure 1:
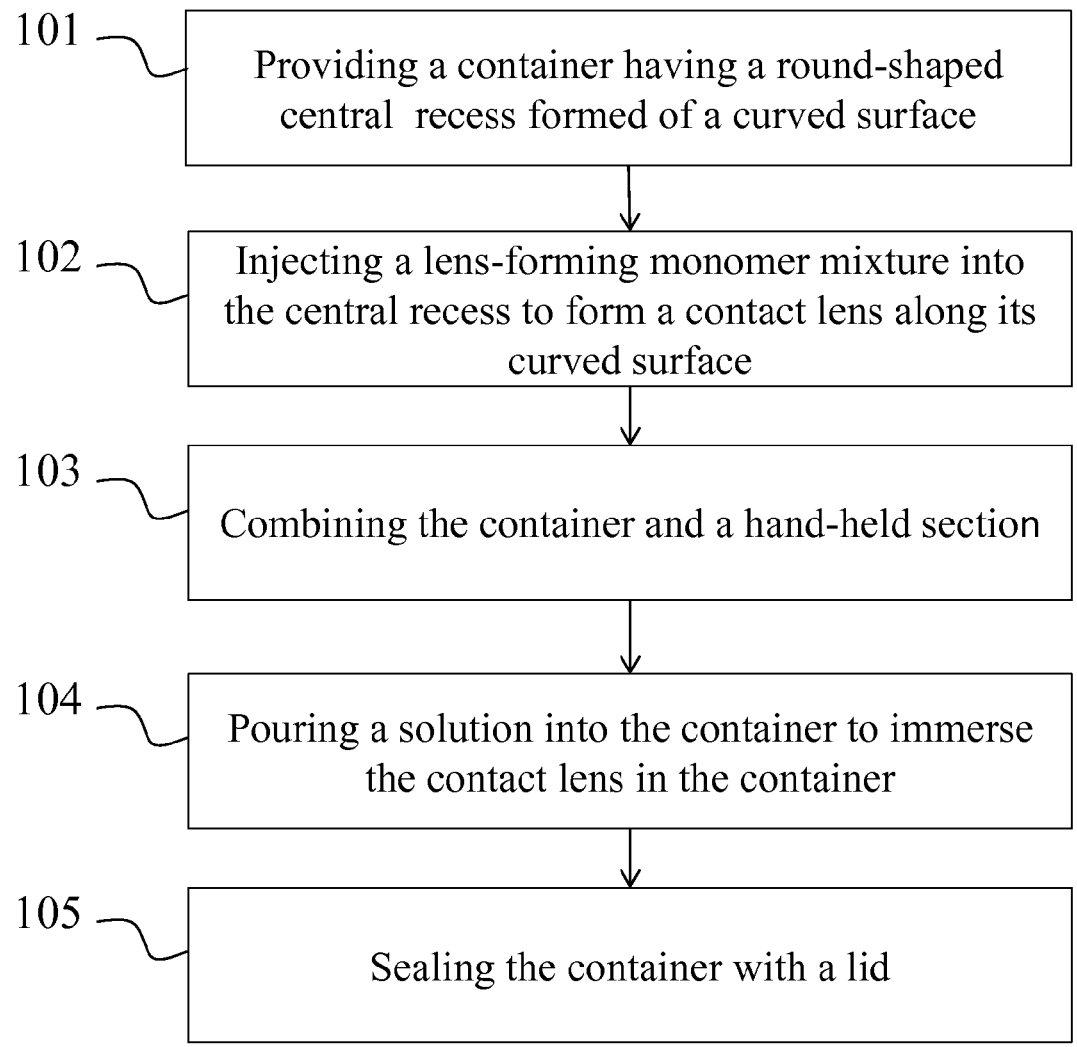
FIG. 1 is a process flow of a method of packaging and manufacturing a contact lens in a container according to a first embodiment of the present invention.

FIG. 1 shows a process flow of a method of packaging and manufacturing a contact lens in a container according to a first embodiment of the present invention. In step 101, firstly, a container and a hand-held section are provided. In this embodiment of the present invention, the container comprises a round-shaped central recess formed of a curved surface of the container, a peripheral groove surrounding the central recess, a rim surrounding the peripheral groove, a tenon disposed on a supporting portion of the container and a hand-held section. The central recess comprises a ring-shaped protruding portion surrounding the curved surface of the central recess. The hand-held section has an opening and an extended portion extending outward from the opening, wherein the hand-held section is provided with an engaging portion at an inner wall thereof. In step 102, injecting a lens-forming monomer mixture into the central recess to form a contact lens along the curved surface of the central recess, for example by spin casting the lens-forming monomer mixture in the container to form the contact lens or alternately, by a molding process. Specifically, in the spin casting process, the lens-forming monomer mixture is introduced, generally via injection, to the round-shaped central recess, and the lens-forming monomer mixture is polymerized while the container is rotated. Alternately, in the molding process, more specifically, the present container is served as a female mold piece for molding the contact lens having a desired optical surface shaped from the curved surface of the container. Note that the central recess is provided with the ring-shaped protruding portion surrounding the curved surface thereof to prevent the contact lens from being flung away from the container during the manufacturing process or having burrs or a rough edge. The lens-forming monomer mixture includes a hydrophilic monomer, a polymerizable compound, and combinations thereof. The polymerizable compound can be selected from a group consisting of polyurethane, allelic, acrylic monomers, and combinations thereof. In step 103, the tenon of the container is engaged with the engaging portion of the hand-held section correspondingly, for example by assembling (e.g., but not limit to, adhesive bonding, heat welding, interference fit, etc.) the container and the hand-held section with respect to each other to combine the container and the hand-held section. Then, in step 104, pouring a solution (e.g. saline solution) into the container to immerse the contact lens in the container. In some embodiments, the solution can be an aqueous solution used as a lachrymal substitute. As such, after immersing the contact lens in the solution, a radius of curvature $R_{lens}$ of the contact lens in its hydrous state is greater than a plurality of continuous radii of curvature $R_{recess}$ of the curved surface of the central recess, and a user can pick it up easily. Finally, in step 105, a lid is adhered to the rim of the container to seal the contact lens and the solution in the container in order to protect the contact lens from damage.

The method of the present invention can manufacture the contact lens in the container directly without performing the process in removing the contact lens from the mold and then moving it into the central recess of the container so as to significantly reduce the expense of the fabrication machine. Therefore, the method of the present invention can simplify the production process of manufacturing the contact lens and packaging process of the same.

In the following, please note the drawings of FIG. 2A to FIG. 2D are the same with those of FIG. 5A to FIG. 5D of the earlier Non-Provisional patent application having Ser. No. 13/180,334, its purpose disclosed herein is for illustrating an example produced by the present method.

Figure 2A:
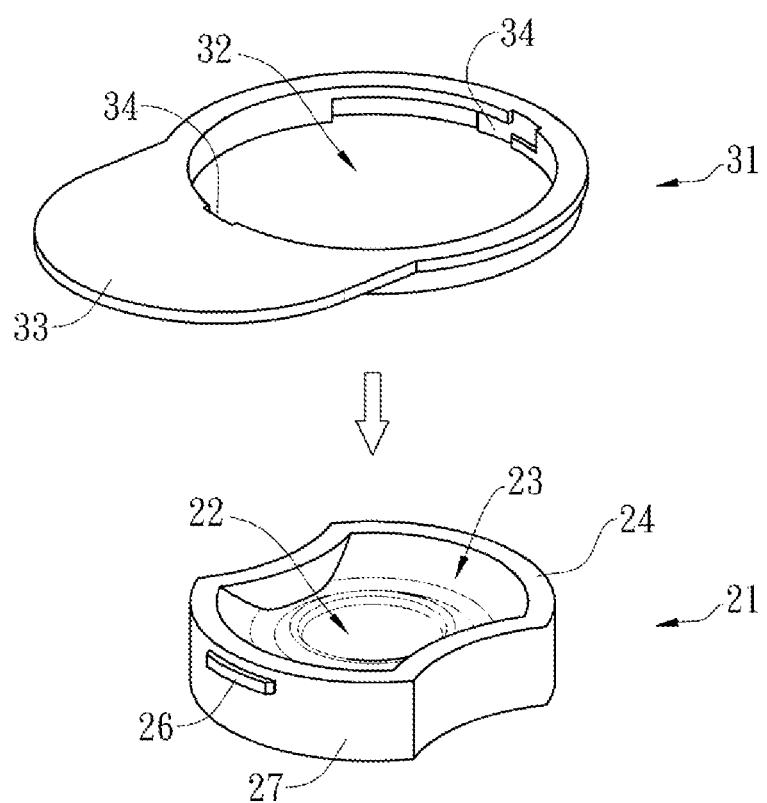
FIG. 2A is a perspective exploded view of an example of the present invention produced by the present method.
Figure 2B:
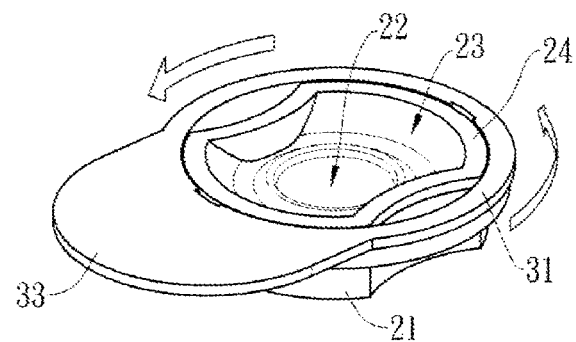
FIG. 2B is a perspective assembly view of the example of FIG. 2A.

FIG. 2A is a perspective exploded view of an example of a container for a contact lens and a hand-held section for manufacturing and packaging a contact lens with the present method, for example as illustrated in FIG. 1. The example provides a container 21 comprising a round-shaped central recess 22 and a peripheral groove 23 surrounding the central recess 22, in which the peripheral groove 23 and the central recess 22 form an accommodation space for holding a contact lens and a solution, The round-shaped central recess 22 of the container 21 may facilitate to perform a spin casting process or a molding process to form the contact lens directly in the container. The container 21 also comprises a rim 24 surrounding the peripheral groove 23 and a supporting portion 27 extending downwardly from the rim 24 as well as a tenon 26 disposed on the supporting portion 27 of the container 21. The central recess 22 is a curved surface having one or a plurality of continuous radii of curvature $R_{recess}$ less than a radius of curvature $R_{lens}$ in its hydrous state. The central recess 22 is further provided with a protruding portion (not shown) to prevent the contact lens from being flung away from the container 21 during the manufacturing process or having burrs or a rough edge. The hand-held section 31 has an opening 32 wherein the hand-held section 31 is provided with an engaging portion 34 at the inner wall thereof, and an extended portion 33 extending outward from the opening 32. As shown in FIG. 2B, when the hand-held section 31 is moved in the direction indicated by the arrow, the tenon 26 of the container 21 for a contact lens is engaged with the engaging portion 34 of the hand-held section 31 correspondingly, for example by assembling the container 21 and the hand-held section 31 with respect to each other, the container 21 and the hand-held section 31 are separately combined together. Referring to FIG. 2A, though the container 21 comprises two tenons 26 symmetrically disposed at opposite outer-sides thereof, and the hand-held section 31 comprises two engaging portions 34 symmetrically disposed at opposite inner sides thereof for matching the tenons 26, only one tenon 26 and one engaging portion 34 are shown in the drawing due to the limitation of the angle of view.

Figure 2C:
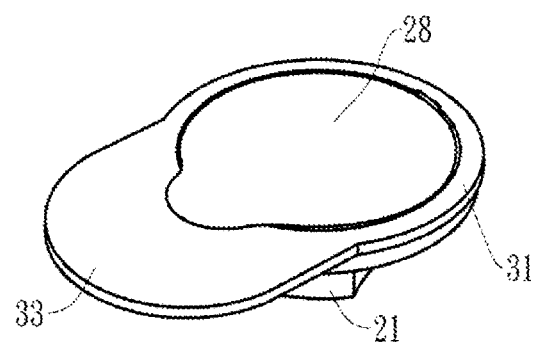
FIG. 2C is a perspective view showing a lid adhered to the container of FIG. 2B.
Figure 2D:
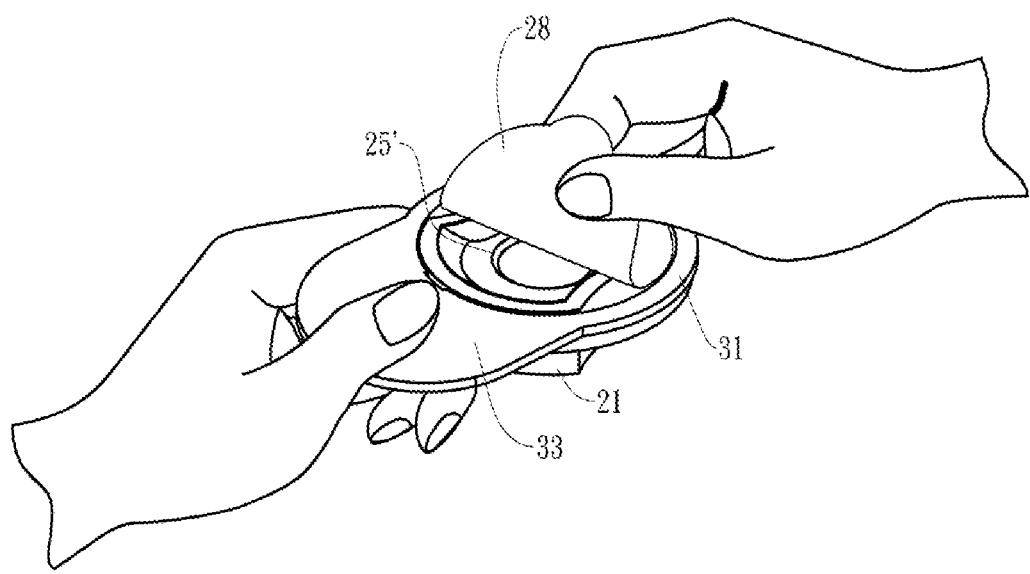
FIG. 2D is a schematic view illustrating a use state of the example of FIG. 2C in which a user tears off the lid 28.

FIG. 2C is a perspective view showing a lid 28 adhered to the container 21 in the example, and FIG. 2D is a schematic view illustrating a use state of the example in which a user tears off the lid 28. In this example, the lid 28 is adhered to the rim 24 of the container 21 to seal a contact lens 25' previously and directly formed in the container 21 by the present method and a solution both already contained in the accommodation space. The user can hold the extended portion 33 of the hand-held section 31 with one hand while tearing off the lid 28 with the other hand, and then pick up the contact lens 25' and wear it.

Figure 3:
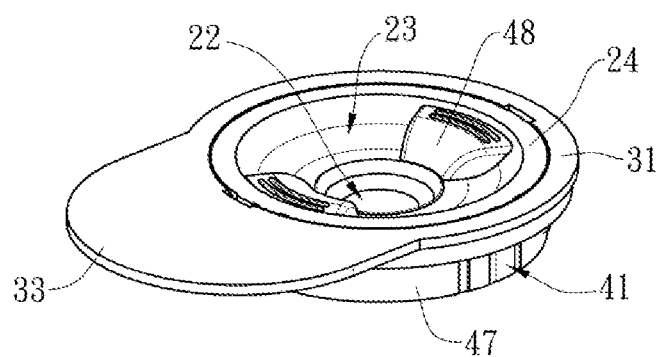
FIG. 3 is a top perspective view of another example of the present invention produced by the present method.

FIG. 3 is a top perspective view of a container 41 for a contact lens in accordance with another example produced by the present method. FIG. 3 and FIG. 2 are substantially the same in terms of the structure of the main parts except that the container 41 of the example of FIG. 3 is provided with two raised sections 48 to prevent the contact lens from attaching thereto, so that the user can pick up the contact lens easily while the container 21 of the example of FIG. 2 is not provided with any raised sections, and that the supporting portion 47 of the example of FIG. 3 is slightly different from the supporting portion 27 of FIG. 2. Specifically, the supporting portion 47 of FIG. 3 is a round peripheral surface while the supporting portion 27 of FIG. 2 is not a round peripheral surface.

Please note the drawing of FIG. 3 is the same with that of FIG. 6 of the earlier Non-Provisional patent application having Ser. No. 13/180,334, its purpose being disclosed herein is for illustrating another example produced by the present method.

Figure 4:
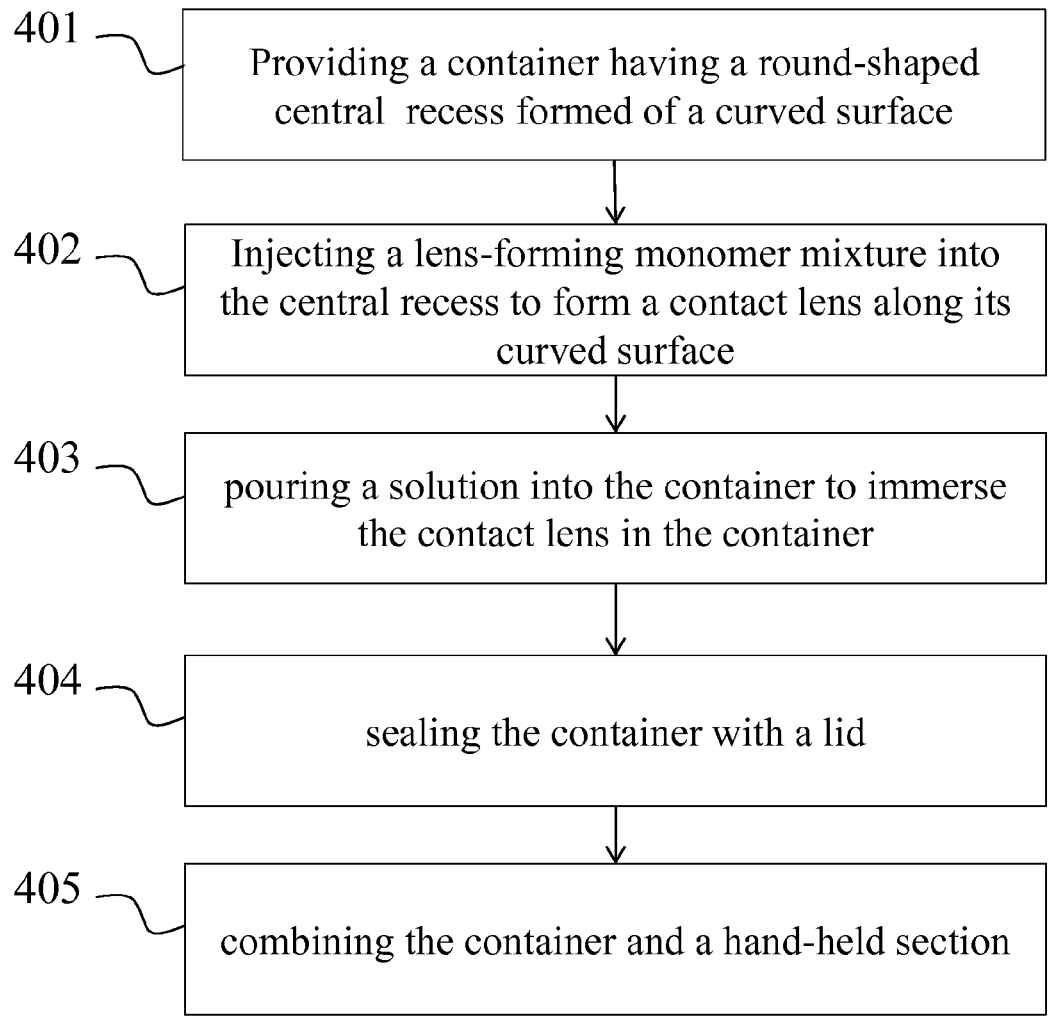
FIG. 4 is a process flow of a method of packaging and manufacturing a contact lens in a container according to a second embodiment of the present invention.

FIG. 4 shows a process flow of a method of packaging and manufacturing a contact lens in a container according to a second embodiment of the present invention. The arrangements and procedures described in the first and second embodiments are similar, as shown in the drawings. The difference between the first and second embodiments (respectively shown in FIGS. 1 and 4) is that the sequence of the steps of FIG. 4 is slightly different from that of FIG. 1. Specifically, the sequence of steps 401-402 of FIG. 4 is the same with that of FIG. 1 of the present application. Step 405 of FIG. 4 corresponding to step 103 of FIG. 1 may be performed after step 404 corresponding to step 105 of FIG. 1. That is to say, in the second embodiment, the method provides step 405 of combining the container and the hand-held section, for example, by assembling the container and the hand-held section with respect to each other, which performed after step 403 of pouring a solution into the container to immerse the contact lens in the container and step 404 of sealing the container with a lid for sealing the contact lens and the solution in the container.

The implementation of the aforementioned steps in the second embodiment has been detailed in the first embodiment, thus no further description will be provided. Moreover, please note that the sequence of the steps may be changed if needed.

While this invention has been described by way of examples and in terms of preferred embodiments, it is to be understood that this invention is not limited hereto. Various substitutions and modifications made without departing from the spirit of this invention are intended to be embraced within the scope of the invention as defined in the appended claims.

What is claimed is:

1. A method of packaging and manufacturing a contact lens in a container, wherein the container is integrally formed with a central recess formed of a curved surface and a ring-shaped protruding portion surrounding the curved surface, the method comprising the steps of:
    providing the container;
    injecting a lens-forming monomer mixture into the central recess to form the contact lens along the curved surface of the central recess while the ring-shaped protruding portion being provided to prevent the contact lens from being flung away from the container for a contact lens;
    combining the container and a hand-held section by engaging the container and the hand-held section in a way of rotating one of the container and the hand-held section;
    pouring a solution into the container to immerse the contact lens in the container; and
    after the steps of combining and pouring, sealing the container with a lid for sealing the contact lens and the solution in the container;
    wherein the curved surface of the central recess has one or a plurality of continuous radii of curvature $R_{recess}$ less than a radius of curvature $R_{lens}$ of the contact lens in its hydrous state.

2. The method of claim 1, further comprising a step of combining the container and the hand-held section by assembling the container and the hand-held section with respect to each other, wherein the container has at least one tenon disposed at a supporting portion of the container and the hand-held section has at least one engaging portion provided at its inner side, the tenon is engaged with the engaging portion.

3. The method of claim 1, wherein the step of forming the contact lens is performed by a spin casting process.

4. The method of claim 1, wherein the step of forming the contact lens is performed by a molding process.

5. The method of claim 1, wherein the container has a peripheral groove surrounding the central recess and provided with at least one raised section.

6. The method of claim 1, wherein the lens-forming monomer mixture is selected from a group consisting of hydrophilic monomer, a polymerizable compound, and combinations thereof.

7. The method of claim 1, wherein the solution is a saline solution.

8. The method of claim 1, wherein the solution comprises an aqueous solution used as a lachrymal substitute.

9. The method of claim 1, wherein the central recess of the container is round-shaped.

10. A method of packaging and manufacturing a contact lens in a container, wherein the container is integrally formed with a central recess formed of a curved surface and a ring-shaped protruding portion surrounding the curved surface, the method comprising the steps of:
    providing the container;
    injecting a lens-forming monomer mixture into the central recess to form the contact lens along the curved surface of the central recess while the ring-shaped protruding portion being provided to prevent the contact lens from being flung away from the container for a contact lens;
    pouring a solution into the container to immerse the contact lens in the container;
    sealing the container with a lid for sealing the contact lens and the solution in the container; and
    after the steps of pouring and sealing, combining the container and a hand-held section by engaging the container and the hand-held section in a way of rotating one of the container and the hand-held section;
    wherein the curved surface of the central recess has one or a plurality of continuous radii of curvature $R_{recess}$ less than a radius of curvature $R_{lens}$ of the contact lens in its hydrous state.

* * * * *